United States Patent
Dodson

(10) Patent No.: US 10,245,573 B2
(45) Date of Patent: Apr. 2, 2019

(54) TOROIDAL BED REACTOR

(75) Inventor: Christopher Dodson, Thatcham (GB)

(73) Assignee: Mortimer Technology Holdings Limited, Thatcham (GB)

( * ) Notice: Subject to any disclaimer, the term of this patent is extended or adjusted under 35 U.S.C. 154(b) by 1052 days.

(21) Appl. No.: 13/882,538

(22) PCT Filed: Nov. 30, 2011

(86) PCT No.: PCT/GB2011/052363
§ 371 (c)(1),
(2), (4) Date: Apr. 30, 2013

(87) PCT Pub. No.: WO2012/073023
PCT Pub. Date: Jun. 7, 2012

(65) Prior Publication Data
US 2013/0220790 A1    Aug. 29, 2013

(30) Foreign Application Priority Data
Nov. 30, 2010 (GB) .................................. 1020299.2

(51) Int. Cl.
*B01J 8/38* (2006.01)
*B01J 8/18* (2006.01)
(Continued)

(52) U.S. Cl.
CPC .......... *B01J 8/1872* (2013.01); *B01J 8/0015* (2013.01); *B01J 8/1827* (2013.01); *B01J 8/386* (2013.01);
(Continued)

(58) Field of Classification Search
CPC ....... C10B 49/12; B02C 19/06; B02C 19/063; B02C 19/066; C10J 3/487; B01J 8/14;
(Continued)

(56) References Cited

U.S. PATENT DOCUMENTS 3,219,420 A * 11/1965 Dielenberg .............. B01J 8/386
34/594
4,882,400 A * 11/1989 Dumain .................. B01J 8/0015
526/106

(Continued)

FOREIGN PATENT DOCUMENTS

DE          3050351 C1    4/1989

OTHER PUBLICATIONS

International Search Report, PCT/GB2011/052363, dated Feb. 10, 2012, 3 pages.
(Continued)

*Primary Examiner* — Jonathan Miller
*Assistant Examiner* — Jonathan Luke Pilcher
(74) *Attorney, Agent, or Firm* — Stinson Leonard Street LLP

(57) ABSTRACT

The present invention provides an apparatus for the processing of a particulate material, the apparatus comprising:
  a processing chamber having one or more inlets for admitting particulate material to be processed and one or more outlets for processed particulate material;
  the processing chamber comprising an annular treatment zone and a plurality of processing fluid inlets arranged in a base of said annular treatment zone and configured so that, in use, jets of processing fluid pass into the annular treatment zone through the plurality of processing fluid inlets to establish a spiral flow of particulate material in the annular processing zone;
  wherein said one or more outlets for processed particulate material are located in the base of said annular treatment zone and surrounded by said plurality of processing fluid inlets so that the spiral flow of particulate material circulates around said one or more outlets;
  the processing chamber further comprising means for deflecting a portion of the spiral flow of particulate
(Continued)

material in the annular processing zone radially inwards from said spiral flow so that said particulate material leaves the processing chamber through said one or more outlets for processed particulate material.

16 Claims, 3 Drawing Sheets

(51) Int. Cl.
  *B01J 8/00* (2006.01)
  *B01J 8/44* (2006.01)
(52) U.S. Cl.
  CPC .. *B01J 8/44* (2013.01); *B01J 8/38* (2013.01); *B01J 8/384* (2013.01); *B01J 2208/00761* (2013.01); *B01J 2219/1945* (2013.01)
(58) Field of Classification Search
  CPC ..... B01J 8/24; B01J 8/384; B01J 8/386; B01J 8/36; B01J 8/38; C10L 349/12; F26B 17/10
  USPC .......................................................... 34/369
  See application file for complete search history.

(56) References Cited

U.S. PATENT DOCUMENTS

| 5,916,434 | A | | 6/1999 | Ripley et al. |
| 6,108,935 | A | | 8/2000 | Dodson |
| 6,139,313 | A | * | 10/2000 | Kostuch ................... B01J 6/001 34/179 |
| 6,158,145 | A | * | 12/2000 | Landon ................. F26B 17/107 34/364 |
| 6,564,472 | B1 | * | 5/2003 | Dodson ................. B01J 8/1827 34/364 |
| 8,071,034 | B2 | * | 12/2011 | de Broqueville .......... B01J 8/14 34/58 |
| 2002/0007772 | A1 | | 1/2002 | Janssen et al. |
| 2008/0219903 | A1 | | 9/2008 | de Broqueville |

OTHER PUBLICATIONS

Written Opinion, PCT/GB2011/052363, dated Feb. 10, 2012, 5 pages.
Abstract of DE3050351; Apr. 20, 1989.
Great Britain Search Report, Application No. 1020299.2, dated Mar. 31, 2011, 1 page.

* cited by examiner

TOROIDAL BED REACTOR

REFERENCE TO RELATED APPLICATIONS

This application is a U.S. national stage application of International Patent Application No. PCT/GB2011/052363, filed Nov. 30, 2011, and claims the benefit of Great Britain Application No. 1020299.2, filed Nov. 30, 2010, the entire disclosures of which are incorporated herein by reference.

FIELD OF THE INVENTION

The present invention relates to an improved toroidal bed reactor. In particular, the present invention relates to a toroidal bed reactor having means for allowing it to operate continuously regardless of the material being processed.

BACKGROUND OF THE INVENTION

Toroidal bed reactors are well known and are described in, for example, EP1652576, GB2418382, EP0382769 and EP0293103. These reactors provide a fast and efficient means for processing feedstock materials and, in particular, thermally processing materials. The material to be processed is fed into a toroidal bed reactor and forced to circulate by a processing fluid that enters at or near the base of the reactor. Once the material has been processed there are various ways in which the material can be discharged from the toroidal bed reactor:

- for materials that once processed are significantly reduced in size, the material can be removed from the reaction chamber entrained in the processing fluid. For example, the processed material may leave with the processing fluid via an exhaust outlet;
- for particles which do not become sufficiently smaller and/or less dense once processed, an opening can be made in the outer wall to allow a portion of the circulating particles to leave the chamber. Due to the circulating motion of the material, making an opening in the outer wall allows the material to exit the chamber radially outwards, travelling along a tangential pathway. The height of this opening can be carefully selected to permit the removal of a given particle size and, hence, to encourage only processed material to be removed;
- a central hole can be provided in the chamber so that once a sufficient weight of material collects at the base of the chamber, i.e. the chamber is overloaded and slumps, a portion of the material can tumble into the hole and out of the chamber;
- the process can be performed in a batchwise manner such that once sufficient material has been processed the chamber can be opened and the material removed.

Obviously, where the material is entirely decomposed by the treatment conditions there is no need for any solid material to be removed from the reactor.

SUMMARY OF THE INVENTION

The present inventors have discovered that the present methods of removing material from the toroidal bed reactor are insufficient. Accordingly, it is an object of the present invention to address at least some of the problems associated with the prior art or to provide a commercially useful alternative thereto.

According to a first aspect, the present invention provides an apparatus 1 for the processing of a particulate material, the apparatus 1 comprising:

a processing chamber 5 having one or more inlets 10 for admitting particulate material to be processed and one or more outlets 15 for processed particulate material;

the processing chamber 5 comprising an annular treatment zone 20 and a plurality of processing fluid inlets 25 arranged in a base 30 of said annular treatment zone 20 and configured so that, in use, jets of processing fluid 35 pass into the annular treatment zone 20 through the plurality of processing fluid inlets 25 to establish a spiral flow of particulate material in the annular processing zone;

wherein said one or more outlets 15 for processed particulate material are located in the base 30 of said annular treatment zone 20 and surrounded by said plurality of processing fluid inlets 25 so that the spiral flow of particulate material circulates around said one or more outlets 15;

the processing chamber 5 further comprising means for deflecting a portion of the spiral flow of particulate material in the annular processing zone 20 radially inwards from said spiral flow so that said particulate material leaves the processing chamber 5 through said one or more outlets 15 for processed particulate material.

DETAILED DESCRIPTION OF PREFERRED EMBODIMENTS

Figure 1A:
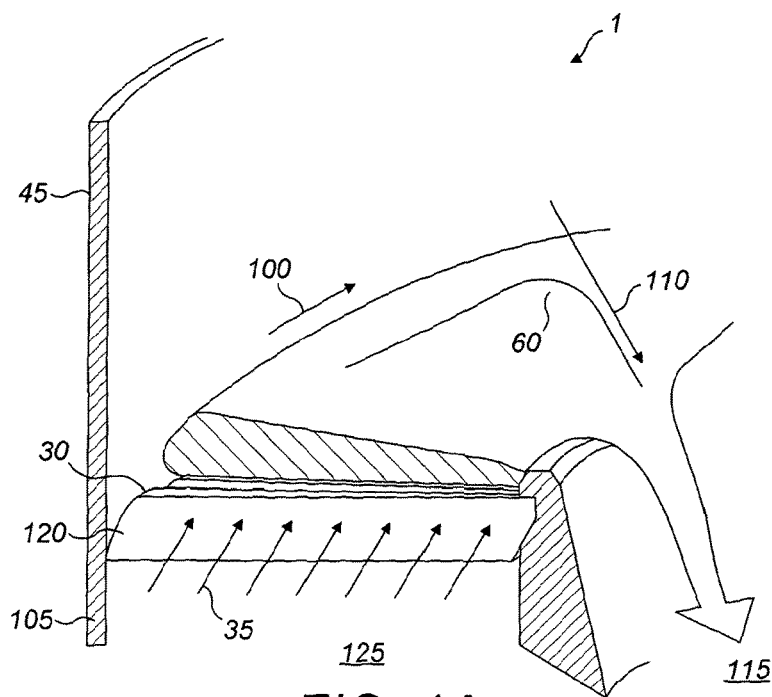
FIG. 1A schematically illustrates a segment of a prior art particulate processing apparatus.
Figure 1B:
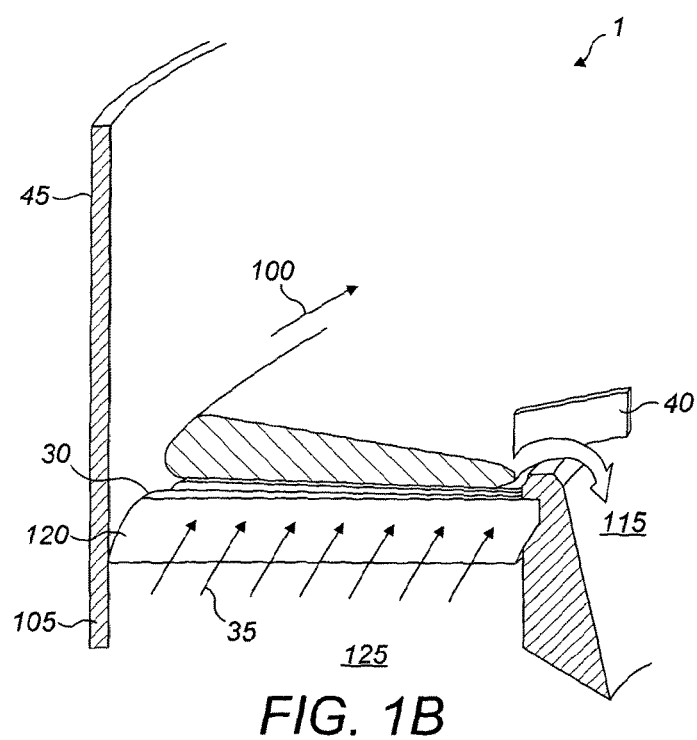
FIG. 1B schematically illustrates a segment of a particulate processing apparatus of the invention.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The processing chamber 5 of the present invention is preferably a conventional toroidal bed reactor. The term "toroidal bed reactor" as used herein refers to a reactor in which a material to be treated is embedded and centrifugally retained within a compact, but turbulent, toroidally circulating bed of particles and processing fluid which circulates about an axis 55 of the processing chamber 5.

The toroidal bed reactor comprises an annular processing zone 20. This doughnut-shaped processing zone is provided by the spiral flow of processing fluid driven by processing fluid inlets 25. Hence, the annular processing zone 20 is defined by the wall 45 of the reactor at its outer extent. The inner edge of the annular processing zone is defined by the interface between the spiral flow the space above the one or more outlets 15 at the core of the chamber where the processing fluid is not driven by the jets. In one embodiment there may be an inner central wall and/or a cap 50 over the one or more outlets 15 which defines the inner edge of the annular processing zone 20. Preferably there is only a single outlet 15 from the annular treatment zone 20.

Preferably the annular processing zone 20 has a substantially circular cross-section. Since the process relies upon gravity in-part for the circulation of the particulate material, preferably the circular cross-section is in a plane that is substantially horizontal.

The toroidal bed reactor further comprises one or more outlets 15 for processed material and preferably these are located in the base 30 of the toroidal bed reactor. Thus, the spiral flow of particulate material and processing fluid precesses around the outlet without passing over the outlet. By the term "around" as used herein is meant that the material circulates around an axis 55 running through the centre of the processing chamber 5. This axis 55 is preferably the central vertical axis 55 of the processing chamber 5 and the annular processing zone 20.

Because the jets of processing fluid 35 are angled up and outward from the base 30 of the annular processing zone 20, the particulate material is driven outwards and around the annular processing zone 20. Accordingly, the particulate material generally moves away from the centre of the zone and cannot, while circulating and without deflection, reach the centrally located outlet(s) 15 while the bed is in use and flowing correctly. In the prior art this material can only reach the outlet 15 when the bed has overloaded and slumps and the material is no longer circulating.

The term "spiral flow" as used herein refers to the circulating processing fluid and the particulate material entrained therein that is circulating around the annular processing zone. The term "bed" is used herein with a similar meaning to refer to the processed material in as it circulates in a substantially stable configuration.

As mentioned above and as disclosed in EP 1 652 576, one discharge technique from a toroidal bed is from the inner edge by allowing particulate material to fall into a discharge zone due to lack of fluid flow in that area. In the toroidal bed reactor of EP 1 652 576 the bed of particulates grows towards the centre with addition of particulates to the bed mass. Eventually, the mass of the bed is such that the kinetic energy in the process gas stream passing through the blades is insufficient to keep the entire bed mass circulating in the manner described. When this occurs, the bed slumps in a 'heap' 60, the particles are swept off the downstream edge (by the process gas stream coming through the blades) and are projected around the annulus to be deposited on the back of the heap. This is shown in FIG. 1A.

Figure 2:
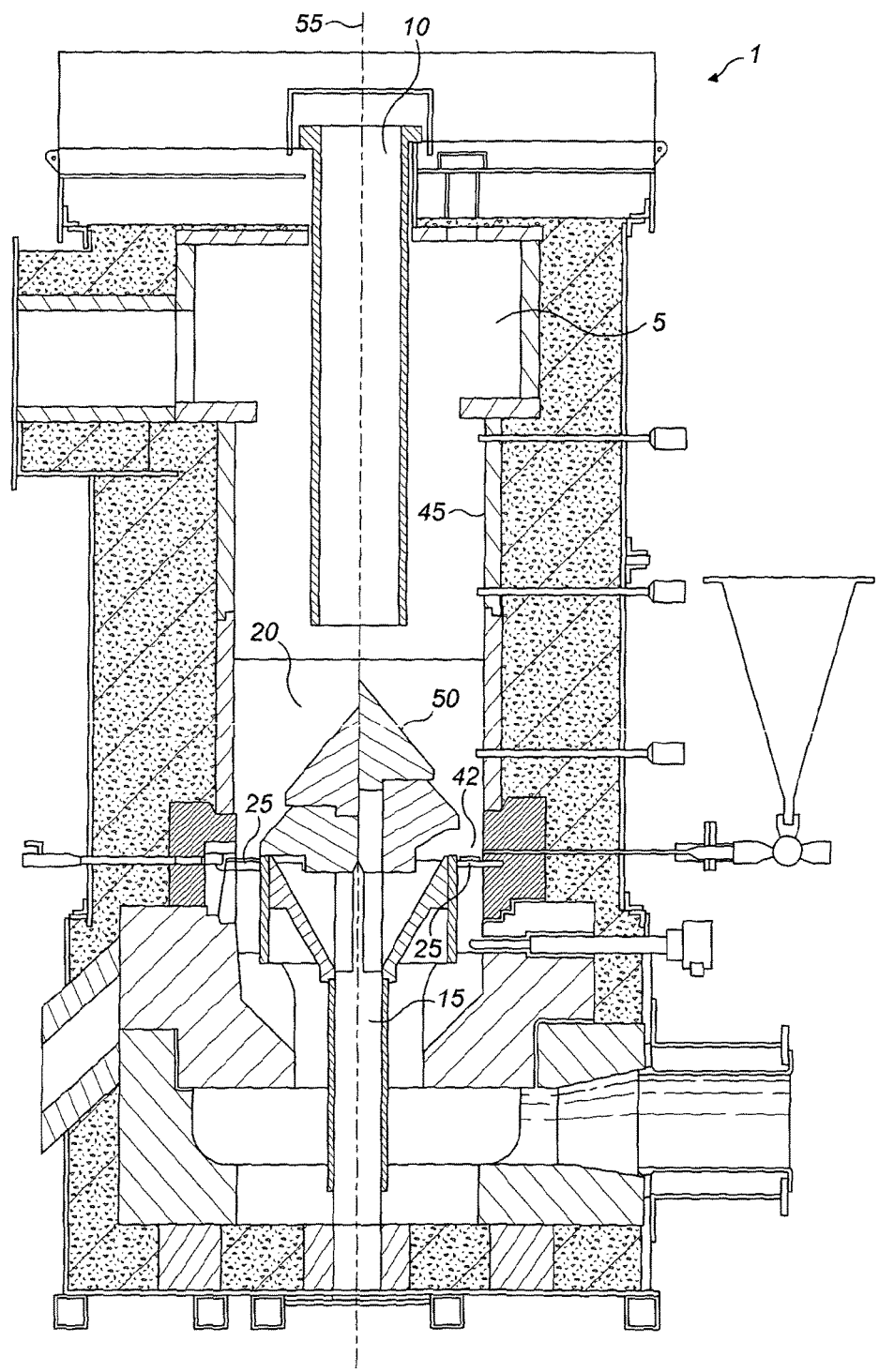
FIG. 2 schematically illustrates a prior art particulate processing apparatus.

The heap 60 that is caused as the bed mass increases effectively travels backwards around the chamber i.e., in the opposite direction to normal travel. As the heap 60 passes an outlet (42 in FIG. 2 of EP 1 652 576 and replicated here as FIG. 2), the material slides down the inside edge of the heap into the discharge outlet. Thus the bed is in an unstable condition by necessity before discharge can occur.

The present inventors have found that before particulate material will discharge from a central outlet in a toroidal bed, the bed must have stalled and slumped into a heap 60 in the direct vicinity of the outlet 15. Furthermore, particulate material will only then pour from the slumped bed as if in an un-fluidised pile adopting its natural slip angle. See FIG. 1A.

The present inventors have discovered that this problem can be overcome by using a deflector for deflecting particles from the spiral flow of particulate material. That is, a portion of the particles circulating in the annular treatment zone 20 can be deflected out of the flow and removed from the processing chamber 5 before the bed reaches a critical mass and slumps.

It has been found that the discharge mechanism described above from EP 1 652 576, is particularly inadequate for processing of non-substantially spherical particulates. That is, particles which adopt a pile or heap with a slip angle of 80° or more, and in particular 90° or more. That is, the present apparatus is especially suitable for the treatment of feedstock that has a tendency not to slip when heaped or piled. This is particularly true for biomass materials that are generally shredded, chipped or chopped and do not flow easily when heaped or piled.

Turning again to the toroidal reactor of EP 1 652 576, when considering high volume flows of material through the reactor, this "slumping" discharge mechanism is inadequate. This discharge technique only discharges from one single point in the annulus of the bed and so the discharge from this one point may need to be several tonnes per hour necessitating a very deep pile to allow such a rate to discharge. When material is piled or heaped, it is unevenly processed due to lack of mixing and process gas heat and mass transfer is uncontrolled.

It has been found that the use of a means for deflecting a portion of the spiral flow of particulate material advantageously allows for:
1. Multiple discharge points from a TORBED reactor chamber, which permits high throughput, shorter residence times for sensitive materials and more predictable/constant processing times. All of these advantages lead to a higher quality, more homogenously processed material.
2. A uniformly mixed and circulating bed, circulating in a controlled manner.

It has been found that using one or more means for diverting is particularly advantageous because it simply:
1. Uses the forward velocity/kinetic energy of the bed to direct material into a discharge outlet; and
2. The means for diverting can be spaced around the inner wall of the chamber to form multiple outlets Thus for biomass torrefaction, for example, where drying and torrefaction of shredded and chipped biomass is needed, this improved discharge technique is essential to provide precision processing (i.e., avoiding instability and slugging/heaping of the material in the chamber) at high volumes (necessary for processing tonnages of biomass). The present apparatus and method is especially advantageous for sensitive material that cannot endure the long and variable residency times that arise when relying on the overloading of the bed for removal of processed material from the reactor.

The preferred particulate material is carbonaceous feedstock. The term "carbonaceous feedstock" as used herein refers to a feedstock which comprises carbon. Examples of carbonaceous feedstocks are coal, petroleum, biomass and biofuel.

Preferably the carbonaceous feedstock is a "biomass feedstock". The term "biomass feedstock" as used herein refers to a biological feedstock derived from living or recently living organisms, such as plant matter, waste, landfill gases and alcohol fuels. Biomass is carbon based and is composed of a mixture of organic molecules containing hydrogen, usually including atoms of oxygen, often nitrogen and also small quantities of other atoms, including alkali, alkaline earth and heavy metals. Biomass does not include organic materials such as fossil fuels which have been transformed by geological processes such as coal or petroleum.

Suitable biomass feedstocks include wood, plant matter and waste (including sewage sludge and agricultural residues). Wood includes forest residues such as dead trees, branches and tree stumps, yard clippings, wood chips and process residues. Plant matter includes biomass grown from, for example, miscanthus, switchgrass, hemp, corn, poplar, willow, sorghum or sugarcane, and includes straw and husks. Preferably the biomass treated has a solid form and a useful calorific value. If the calorific value is too high or too low then the biomass may be initially homogenized to provide a feedstock of substantially uniform calorific value.

The process of the present invention is carried out in a toroidal bed reactor. A toroidal bed (TORBED®) reactor and process is described in, for example, EP 0068853, U.S. Pat. No. 4,479,920, and EP 1791632, the disclosures of which are incorporated here by reference. In the process, a material to be treated is preferably embedded and centrifugally retained within a compact, but turbulent, toroidally circulating bed of particles, which circulate about an axis 55 of the processing chamber 5. Specifically, the material forms particles within the bed which may be circulated above a plurality of fluid inlets arranged around the base of the processing chamber 5. The fluid inlets are preferably arranged in overlapping relationship and the particles are caused to circulate around the bed by the action of a processing fluid, for example a gas injected into the processing chamber 5 from beneath and through the fluid inlets. The fluid inlets may, for example, be a plurality of outwardly radiating, inclined vanes arranged around the base of the processing chamber 5.

Preferably a toroidal bed reactor for use in the present invention has a reaction chamber with a substantially circumferentially directed flow of fluid generated therein to cause the biomass feedstock to circulate rapidly about an axis 55 of the reaction chamber in a toroidal band, and to heat the biomass feedstock, wherein the fluid comprises gas or gases introduced into the reaction chamber. Preferably the flow of fluid within the reaction chamber has a horizontal and a vertical velocity component. Preferably the chamber comprises a plurality of outwardly radiating inclined fluid inlets at or adjacent a base 30 thereof, and wherein fluid is directed through the fluid inlets at the base of the chamber to generate the circumferentially directed flow of fluid within the chamber. Preferably the fluid directed through said fluid inlets is given both horizontal and vertical velocity components.

The feedstock may be introduced into the reactor(s) through one or more inlets 10, under the influence of a compressed gas such as compressed air and/or an inert gas such as nitrogen. In a preferred embodiment of the present invention, the inlet is located above the fluid inlets at the base of the chamber and the carbonaceous feedstock is introduced into the chamber by a gravity feed mechanism, for example using an air lock device such as a rotary valve. The gravity feed mechanism may be provided in a vertical wall of the chamber or through the roof.

It will be appreciated that the flow of fluid may be generated either before or after the feedstock is introduced into the chamber. Alternatively, the flow of fluid may be generated at the same time as the feedstock is introduced into the chamber.

The flow of the fluid through the chamber may be generated in a manner as described in EP-B-0 382 769 and EP-B-0 068 853, i.e. by supplying a flow of fluid into and through the processing chamber 5 and directing the flow by means of the plurality of outwardly radiating and preferably overlapping fluid inlets arranged in the form of a disc and located at or adjacent to the base of the processing chamber 5. The fluid inlets are inclined relative to the base of the chamber so as to impart rotational motion to the heating fluid entering the chamber, hence causing the heating fluid to circulate about a substantially vertical axis 55 of the chamber as it rises. The fluid inlets may comprise, for example, a plurality of outwardly radiating vanes at or adjacent the base of the chamber. The vanes (or blades) are typically inclined relative the base and preferably disposed in overlapping arrangement.

Preferably the apparatus 1 further comprises a cap 50 arranged over said one ore more outlets 15 for processed particulate material to prevent particulate material leaving the chamber via said outlet(s) 15 without having been deflected by said means for deflecting a portion of the spiral flow of particulate material. This avoids any accidental discharge of unprocessed material. Preferably the outlets are construed as the exit from the chamber that lies in the same plane as the base 30.

Preferably the means for deflecting is adjustable between a first condition whereby, in use, it deflects a portion of the spiral flow of particulate material in the annular processing zone radially inwards from said spiral flow, and a second condition whereby it does not. Thus it can be ensured that no material is removed from the chamber before the bed is up to temperature of before a suitable residence time has elapsed and the material has been fully processed.

The means for deflecting a portion of the spiral flow of particulate material can take any form that is capable of deflecting the particles radially inwards from the spiral flow. In one embodiment the means for deflecting comprises an obstruction means extending into said spiral flow of particulate material. Preferably the obstruction means takes the form of a scoop 40 or blade extending into the spiral flow path. Preferably the obstruction means comprises a substantially flat surface arranged to direct at least a portion of the spiral flow of particulate material out of said spiral flow.

In one embodiment the obstruction means is a steel scoop 40 extending into the inner edge of the spiral flow path. The height and length of the scoop 40 will determine the fraction of the passing bed mass that is intercepted and diverted into the discharge and this can be configured and arranged simply.

Figure 3:
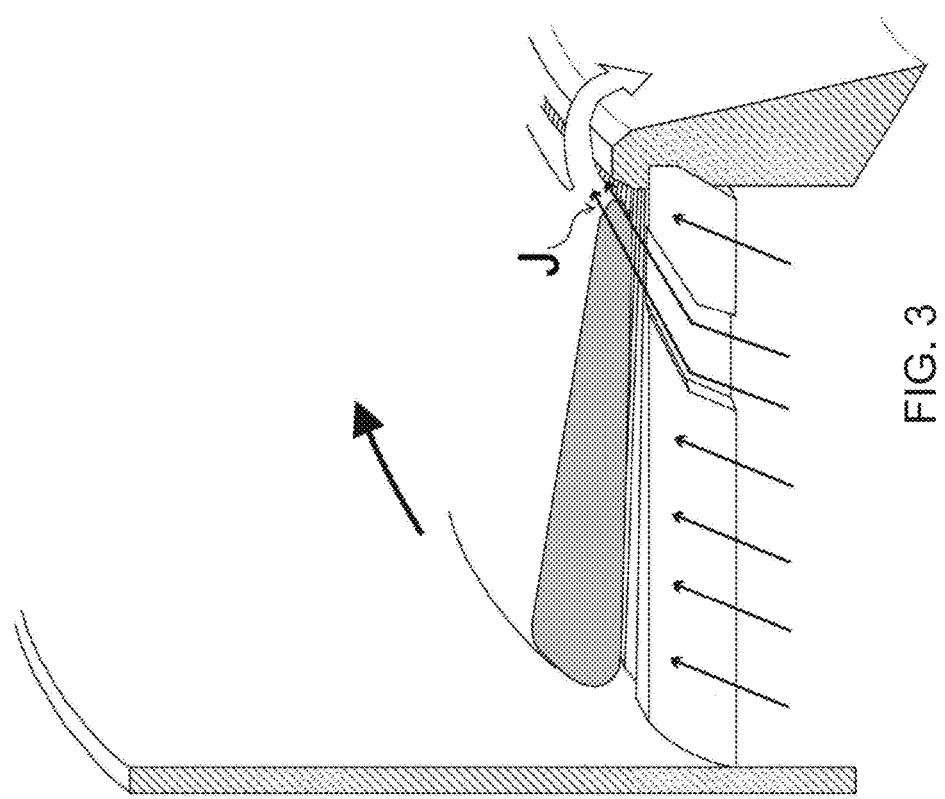
FIG. 3 schematically illustrates an alternative embodiment of the deflector system.

In another embodiment the means for deflecting a portion of the spiral flow of particulate material comprises one or more jets of fluid. That is, a jet that is at least partially angled against the processing fluid jets so as to deflect a portion of the particulate material out of the spiral flow. The jet is preferably processing fluid for simplicity. See element J in FIG. 3.

In a further embodiment the means for deflecting a portion of the spiral flow of particulate material comprises a suction tube for drawing a portion of the particulate material from the spiral flow thereof. That is, an active vacuum is applied to the outlet facing the inner edge of the spiral flow to draw particulate material out of the spiral flow.

It is especially preferred that the means for deflecting is arranged to deflect from the spiral flow a portion of the particulate material at a desired height relative to the base of the annular treatment zone 20. This is particularly advantageous because this can be used to tailor the output material. For example, by having the outlet arranged above the base 30 of the annular treatment zone 20, heavier unprocessed and recently added particulate material is not deflected into the outlet until it has been processed sufficiently to reduce in mass and circulate higher in the bed.

In one embodiment the means for deflecting a portion of the spiral flow of particulate material is a portion of the base of the annular treatment zone 20 without a processing fluid inlet. Thus, when the particulate material passes over this portion of the base 30 the particulate loses its motive force and descends in the bed. Thus the particulate material can tumble to a predetermined portion of the base and then fall through the outlet, optionally after the formation of a small controlled and static mound of particulate material. In one embodiment the base portion which is free of processing fluid inlets is sloped to encourage the particulate material towards the outlet(s).

Preferably the processing fluid is a gas. Since the final product is preferably in particulate form, the use of a processing gas rather than a liquid avoids the need for a complex separation or drying step to be performed.

The processing gas may be an oxygen depleted gas. The term "oxygen-depleted gas" as used herein refers to a gas comprising a lower percentage of oxygen than in atmospheric air. Preferably the oxygen depleted gas has less than 20% oxygen, preferably between 1 and 15% and most preferably between 5 and 10% by volume. The oxygen-depleted gas may contain steam in addition to the depleted levels of oxygen.

Preferably the plurality of processing fluid inlets 25 are arranged so that the jets of processing fluid 35 are directed into the annular treatment zone 20 at an elevation of from 5 to 45° relative to the plane of the annular treatment zone 20.

Preferably the plurality of processing fluid inlets 25 are arranged so that the jets of processing fluid 35 are directed into the annular treatment zone 20 away from the centre of the annular treatment zone 20 at an angle of from 10 to 75° relative to a tangent of the outer perimeter of a cross-section in the plane of the annular treatment zone 20.

According to a second aspect, the present invention provides a method of processing a particulate material, the method comprising:

introducing a processing fluid into an annular treatment zone 20 of a processing chamber 5 through a plurality of processing fluid inlets 25 arranged in a base 30 of said annular treatment zone 20 so as to establish a spiral flow of said processing fluid within said annular treatment zone 20;

introducing a particulate material to be processed into said annular treatment zone 20 to be entrained in said spiral flow of said processing fluid and processed by said processing fluid; and deflecting a portion of the entrained particulate material radially inwards from said spiral flow; and obtaining the deflected portion of particulate material from one or more outlets 15 located in the middle of said base of said annular treatment zone 20.

100 direction of bed travel
105 outer wall
110 natural slip angle of material
115 solids discharge
120 blades
125 process gas stream Preferably the method of the present invention is carried out using the apparatus 1 described herein.

Although preferred embodiments of the invention have been described herein in detail, it will be understood by those skilled in the art that variations may be made thereto without departing from the scope of the invention or of the appended claims.

The invention claimed is:

1. A toroidal bed reactor apparatus for the processing of a particulate material, the apparatus comprising:

a toroidal bed reactor processing chamber having one or more inlets for admitting particulate material to be processed and one or more outlets for processed particulate material;

the toroidal bed reactor processing chamber comprising an annular processing zone, a chamber head space above the annular processing zone, and a plurality of processing fluid inlets arranged in a base of said annular processing zone and configured so that, in use, jets of processing fluid pass into the annular processing zone through the plurality of processing fluid inlets to establish a spiral flow of toroidally circulating bed mass of particulate material in the annular processing zone;

wherein said one or more outlets for processed particulate material are located in the base of said annular processing zone and surrounded by said plurality of processing fluid inlets so that the spiral flow of particulate material circulates around said one or more outlets;

the toroidal bed reactor processing chamber further comprising a deflector above said one or more outlets and in the annular processing zone below the chamber head space for deflecting a portion of the spiral flow of particulate material from the toroidally circulating bed mass in the annular processing zone radially inwards from said spiral flow so that said particulate material leaves the processing chamber through said one or more outlets for processed particulate material; and wherein said deflector for deflecting is adjustable to a deflecting condition in which the deflector comprises an obstruction extending into said spiral flow of particulate material and deflects a portion of entrained particulate material from the spiral flow radially inwards and out of the spiral flow, and adjustable from a non-deflecting condition in which the deflector does not deflect a portion of the entrained particulate material from the spiral flow radially inwards and out of the spiral flow.

2. An apparatus according to claim 1, wherein the apparatus further comprises a cap arranged over said one or more outlets for processed particulate material to prevent particulate material leaving the chamber via said outlet without having been deflected by said deflector for deflecting a portion of the spiral flow of particulate material.

3. An apparatus according to claim 1 wherein the obstruction comprises a substantially flat surface arranged to direct at least a portion of the spiral flow of particulate material out of said spiral flow.

4. An apparatus according to claim 1, wherein said deflector for deflecting is arranged to deflect from the spiral flow a portion of the particulate material at a desired height relative to the base of the annular treatment zone.

5. An apparatus according to claim 1, wherein the processing fluid is a gas.

6. An apparatus according to claim 1, wherein the plurality of processing fluid inlets are arranged so that the jets of processing fluid are directed into the annular processing zone at an elevation of from 5 to 45° relative to the plane of the annular processing zone.

7. An apparatus according to claim 1, wherein the plurality of processing fluid inlets are arranged so that the jets of processing fluid are directed into the annular processing zone away from the centre of the annular processing zone at an angle of from 10 to 75° relative to a tangent of the outer perimeter of a cross-section in the plane of the annular processing zone.

8. The apparatus of claim 1 wherein the deflector is positioned to deflect particulate material at the base of the annular processing zone.

9. The apparatus of claim 1, wherein the obstruction is a steel scoop extending into an inner edge of the spiral flow path.

10. A toroidal bed reactor apparatus for the processing of a particulate material, the apparatus comprising:
   a toroidal bed reactor processing chamber having one or more inlets for admitting particulate material to be processed and one or more outlets for processed particulate material;
   the toroidal bed reactor processing chamber comprising an annular processing zone, a chamber head space above the annular processing zone, and a plurality of processing fluid inlets arranged in a base of said annular processing zone and configured so that, in use, lets of processing fluid pass into the annular processing zone through the plurality of processing fluid inlets to establish a spiral flow of toroidally circulating bed mass of particulate material in the annular processing zone;
   wherein said one or more outlets for processed particulate material are located in the base of said annular processing zone and surrounded by said plurality of processing fluid inlets so that the spiral flow of particulate material circulates around said one or more outlets;
   the toroidal bed reactor processing chamber further comprising a deflector above said one or more outlets and in the annular processing zone below the chamber head space for deflecting a portion of the spiral flow of particulate material from the toroidally circulating bed mass in the annular processing zone radially inwards from said spiral flow so that said particulate material leaves the processing chamber through said one or more outlets for processed particulate material; and
   wherein said deflector for deflecting is adjustable to a deflecting condition in which the deflector deflects a portion of entrained particulate material from the spiral flow radially inwards and out of the spiral flow, and adjustable from a non-deflecting condition in which the deflector does not deflect a portion of the entrained particulate material from the spiral flow radially inwards and out of the spiral flow;
   wherein the deflector for deflecting a portion of the spiral flow of particulate material consists of one or more jets of fluid.

11. An apparatus according to claim 10, wherein the apparatus further comprises a cap arranged over said one or more outlets for processed particulate material to prevent particulate material leaving the chamber via said outlet without having been deflected by said deflector for deflecting a portion of the spiral flow of particulate material.

12. An apparatus according to claim 10, wherein said deflector for deflecting is arranged to deflect from the spiral flow a portion of the particulate material at a desired height relative to the base of the annular treatment zone.

13. An apparatus according to claim 10, wherein the processing fluid is a gas.

14. An apparatus according to claim 10, wherein the plurality of processing fluid inlets are arranged so that the jets of processing fluid are directed into the annular processing zone at an elevation of from 5 to 45° relative to the plane of the annular processing zone.

15. An apparatus according to claim 10, wherein the plurality of processing fluid inlets are arranged so that the jets of processing fluid are directed into the annular processing zone away from the centre of the annular processing zone at an angle of from 10 to 75° relative to a tangent of the outer perimeter of a cross-section in the plane of the annular processing zone.

16. A method of processing a particulate material, the method comprising:
   introducing a processing fluid into an annular processing zone of a toroidal bed reactor processing chamber through a plurality of processing fluid inlets arranged in a base of said annular processing zone so as to establish a spiral flow of said processing fluid within said annular processing zone;
   introducing a particulate material to be processed into said annular processing zone to be entrained in said spiral flow of said processing fluid and processed by said processing fluid in a spirally and toroidally circulating bed of particles;
   after a residence time has elapsed of processing the particulate material by the processing fluid with the particulate material entrained in the spiral flow, adjusting a deflector into a deflecting condition in which the deflector deflects a portion of the entrained particulate material from the spiral flow radially inwards and out of the spiral flow, and thereby adjusting the deflector out of a non-deflecting condition in which the deflector does not deflect a portion of the entrained particulate material from the spiral flow radially inwards and out of the spiral flow, wherein the deflector comprises an obstruction extending into said spiral flow of particulate material when it is in said condition in which it deflects a portion of the entrained particulate material radially inwards from the spiral flow; and
   obtaining the deflected portion of particulate material from one or more outlets located below the deflector in the middle of said base of said annular processing zone.

* * * * *